US012198650B2

(12) United States Patent
Lai

(10) Patent No.: US 12,198,650 B2
(45) Date of Patent: Jan. 14, 2025

(54) DISPLAY PANEL AND TERMINAL DEVICE

(71) Applicant: GUANGZHOU CHINA STAR OPTOELECTRONICS SEMICONDUCTOR DISPLAY TECHNOLOGY CO., LTD., Guangdong (CN)

(72) Inventor: Kuhuang Lai, Guangdong (CN)

(73) Assignee: GUANGZHOU CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/905,252

(22) PCT Filed: Jul. 22, 2022

(86) PCT No.: PCT/CN2022/107339
§ 371 (c)(1),
(2) Date: Aug. 29, 2022

(87) PCT Pub. No.: WO2024/011654
PCT Pub. Date: Jan. 18, 2024

(65) Prior Publication Data

US 2024/0221698 A1 Jul. 4, 2024

(30) Foreign Application Priority Data

Jul. 15, 2022 (CN) ........................ 202210837604.6

(51) Int. Cl.
*G09G 3/36* (2006.01)

(52) U.S. Cl.
CPC ......... *G09G 3/3614* (2013.01); *G09G 3/3688* (2013.01); *G09G 2310/0297* (2013.01); *G09G 2330/021* (2013.01)

(58) Field of Classification Search
CPC ............... G09G 3/3614; G09G 3/3688; G09G 2310/0297; G09G 2330/021; G09G 3/3607
See application file for complete search history.

(56) References Cited

U.S. PATENT DOCUMENTS 10,192,501 B2 * 1/2019 Sakurai ............. G02F 1/134336
10,522,099 B2 * 12/2019 Guo ..................... G09G 3/3607
(Continued)

FOREIGN PATENT DOCUMENTS

CN 101216650 A 7/2008
CN 101251692 A 8/2008
(Continued)

OTHER PUBLICATIONS

Chinese Office Action issued in corresponding Chinese Patent Application No. 202210837604.6 dated Apr. 29, 2023, pp. 1-8.
(Continued)

*Primary Examiner* — Grant Sitta
(74) *Attorney, Agent, or Firm* — PV IP PC; Wei Te Chung

(57) ABSTRACT

A terminal device and a display panel are provided. The display panel includes sub-pixel columns. Each of the sub-pixel columns includes sub-pixels of a same color. The sub-pixels include first sub-pixels and second sub-pixels arranged alternately. The sub-pixel columns compose pixel groups. Colors of sub-pixels in different sub-pixel columns in one same pixel group are different. A data line is disposed between two adjacent sub-pixel columns. The first sub-pixel of one of the two sub-pixel columns of a same color in two adjacent pixel groups and the second sub-pixel of another one of the two sub-pixel columns of the same color in the two adjacent pixel groups are electrically connected to one same data line.

20 Claims, 3 Drawing Sheets

(56) References Cited

U.S. PATENT DOCUMENTS

| | | | | |
|---|---|---|---|---|
| 10,861,368 | B2 * | 12/2020 | Zheng | G09G 3/20 |
| 11,031,436 | B2 * | 6/2021 | Kwon | H10K 59/1213 |
| 11,114,005 | B2 * | 9/2021 | Dong | G09G 3/20 |
| 11,120,754 | B2 | 9/2021 | Chen | |
| 11,328,676 | B2 * | 5/2022 | Hyeon | H10K 77/111 |
| 11,587,489 | B2 * | 2/2023 | Zhou | G09G 3/2003 |
| 11,929,037 | B2 * | 3/2024 | Hong | G09G 3/3291 |
| 2006/0120160 | A1 | 6/2006 | Park et al. | |
| 2009/0189881 | A1 * | 7/2009 | Ooishi | G09G 3/20 345/55 |
| 2011/0187682 | A1 | 8/2011 | Kim et al. | |
| 2016/0189640 | A1 * | 6/2016 | Guo | G09G 3/3688 345/694 |
| 2021/0233455 | A1 * | 7/2021 | Yang | G09G 3/2003 |
| 2022/0366828 | A1 * | 11/2022 | Park | G09G 3/2003 |

FOREIGN PATENT DOCUMENTS

| | | | |
|---|---|---|---|
| CN | 102707525 | A | 10/2012 |
| CN | 102955310 | A | 3/2013 |
| CN | 105467704 | A | 4/2016 |
| CN | 111025710 | A | 4/2020 |
| CN | 213781542 | U | 7/2021 |
| CN | 113703236 | A | 11/2021 |
| CN | 113777839 | A | 12/2021 |

OTHER PUBLICATIONS

International Search Report in International application No. PCT/CN2022/107339,mailed on Nov. 30, 2022.

Written Opinion of the International Search Authority in International application No. PCT/CN2022/107339,mailed on Nov. 30, 2022.

* cited by examiner

DISPLAY PANEL AND TERMINAL DEVICE

BACKGROUND OF INVENTION

Field of Invention

The present application relates to the field of display and particularly to a display panel and a terminal device.

Description of Prior Art

Liquid crystal display panels, such as products of mobile phones, computers, televisions, etc., are widely used in human lives. In order to solve afterimages and screen flicker incurred by residual of direct currents of the display panels, the liquid crystal display panels are generally driven by a polarity inversion manner in the prior art. Common polarity inversion manners include frame inversion, dot inversion, row inversion, and column inversion, etc. In order to better improve quality and performance of displayed images, the dot inversion is usually used in the current display panels.

However, in the prior art, in order to realize the dot inversion, a data line needs to be electrically connected to sub-pixels of different colors in adjacent sub-pixel columns of two colors, i.e., one data line is electrically connected sub-pixels of different colors. Because signals need to be switched in the data line to charge the sub-pixels of different colors, a problem of insufficient charging time for sub-pixels occurs during the display panel displaying images such as red and blue, red and green, and green and blue. Specifically, one data line is electrically connected to a red sub-pixel and a green sub-pixel. During displaying an image of red and green, signals need to be switched in this data line to charge the red sub-pixel and the green sub-pixel at different times. In this way, the red sub-pixel and green sub-pixel are both made to have the problem of insufficient charging time and problems of insufficient charging rate and uneven charging incurred by the insufficient charging time.

SUMMARY OF INVENTION

Embodiments of the present application provide a display panel and a terminal device, which are configured to solve the problem of the insufficient sub-pixel charging time in the current dot inversion driving method.

The present application provides a display panel, including: a plurality of sub-pixel columns arranged along a first direction, wherein each of the sub-pixel columns includes a plurality of sub-pixels arranged along a second direction, the first direction is perpendicular to the second direction, and colors of the sub-pixels are same in one of the sub-pixel columns; and a plurality of data lines, wherein one of the plurality of data lines is disposed between adjacent two of the sub-pixel columns; wherein the sub-pixels of each of the plurality of sub-pixel columns include at least one first sub-pixel and at least one second sub-pixel, and the first sub-pixels and the second sub-pixels are arranged alternately; and wherein at least two pixel groups arranged along the first direction include the sub-pixel columns; and colors of the sub-pixels in different sub-pixel columns are different from each other in same one of the pixel groups, and the first sub-pixel of one of two sub-pixel columns of a same color in two adjacent pixel groups and the second sub-pixel of another one of the two sub-pixel columns of the same color in the two adjacent pixel groups are connected to same one of the data lines.

Optionally, in some embodiments of the present application, in one of the pixel groups, the first sub-pixel of any one of the sub-pixel columns is electrically connected to one of the data lines adjacent to the sub-pixel columns, the first sub-pixels in adjacent two of the sub-pixel columns are electrically connected to different two of the data lines, the second sub-pixel in one of the sub-pixel columns is electrically connected to the data line in another pixel group adjacent to the pixel group.

Optionally, in some embodiments of the present application, polarities of electrical signals of the sub-pixels electrically connected to same one of the data lines are same, and a polarity of an electrical signal of the sub-pixels electrically connected to one of any two adjacent data lines is opposite to a polarity of an electrical signal of the sub-pixels electrically connected to another one of the two adjacent data lines.

Optionally, in some embodiments of the present application, the display panel further includes a plurality of connection lines. The second sub-pixels in the sub-pixel columns are connected to the data lines that are corresponded through the connection lines.

Optionally, in some embodiments of the present application, each of the connection lines is insulated from other data lines except the data lines connected to the connection lines.

Optionally, in some embodiments of the present application, each of the pixel groups includes at least three adjacent sub-pixel columns arranged along the first direction, the three sub-pixel columns include a first color sub-pixel column, a second color sub-pixel column, and a third color sub-pixel column; any adjacent three of the pixel groups arranged along the first direction include a first pixel group, a second pixel group, and a third pixel group; the third color sub-pixel column of the first pixel group is adjacent to the first color sub-pixel column of the second pixel group, the third color sub-pixel column of the second pixel group is adjacent to the first color sub-pixel column of the third pixel group, three of the data lines electrically connected to each of the pixel groups comprise a first data line, a second data line, and a third data line; the second data line is disposed between the first color sub-pixel column and the second color sub-pixel column, the third data line is disposed between the second color sub-pixel column and the third color sub-pixel column, the first data line is disposed between the third color sub-pixel column and the first color sub-pixel column of another adjacent one of the pixel groups; in any one of the pixel groups, the first sub-pixel of the first color sub-pixel column is electrically connected to the second data line that is corresponded, the first sub-pixel of the second color sub-pixel column is electrically connected to the third data line that is corresponded, and the first sub-pixel of the third color sub-pixel column is electrically connected to the first data line that is corresponded; and in the second pixel group, the second sub-pixel of the first color sub-pixel column is electrically connected to the second data line of the first pixel group or the second data line of the third pixel group, the second sub-pixel of the second color sub-pixel column is electrically connected to the third data line of the first pixel group or the third data line of the third pixel group, and the second sub-pixel of the third color sub-pixel column is electrically connected to the first data line of the first pixel group or the first data line of the third pixel group.

Optionally, in some embodiments of the present application, the display panel further includes a plurality of connection lines. The plurality of connection lines include a first connection line, a second connection line, and a third connection line. In the second pixel group, the second sub-pixel of the first color sub-pixel column is electrically connected to the second data line of the first pixel group or is electrically connected to the second data line of the third pixel group through the first connection line, the second sub-pixel of the second color sub-pixel column is electrically connected to the third data line of the first pixel group or the third data line of the third pixel group through the second connection line, and the second sub-pixel of the third color sub-pixel column is electrically connected to the first data line of the first pixel group or the first data line of the third pixel group through the third connection line.

Optionally, in some embodiments of the present application, the display panel further includes a plurality of demultiplexing circuits. The plurality of demultiplexing circuits are electrically connected to the plurality of data lines, and adjacent two of the plurality of data lines are respectively electrically connected to adjacent two of the plurality of demultiplexing circuits.

Optionally, in some embodiments of the present application, the plurality of demultiplexing circuits include one input terminal and at least three output terminals, the at least three output terminals are electrically connected to the data lines, and polarities of electrical signals of the input terminals of adjacent two of the plurality of demultiplexing circuits are opposite.

Correspondingly, the present application further provides a terminal device. The terminal device includes the display panel mentioned in any one of the above.

In the display panel and the terminal device provided by the present application, in the two sub-pixel columns of a same color in two adjacent pixel groups, a first sub-pixel in one of the sub-pixel columns and a second sub-pixel in another one of the sub-pixel columns are electrically connected to same one of the data lines. Therefore, one same data line connected to sub-pixels of one same color is realized. By combining this structure with column inversion, dot inversion can be realized. As one data line is electrically connected to sub-pixels of one same color, when the display panel displays red-blue, red-green, green-blue images, there is no need to switch signals to charge sub-pixels of different colors, so that charging times of each sub-pixel is sufficient, which remedies the problem of uneven charging, and improves display quality and display performance of the display panel.

DETAILED DESCRIPTION OF EMBODIMENTS

Figure 1:
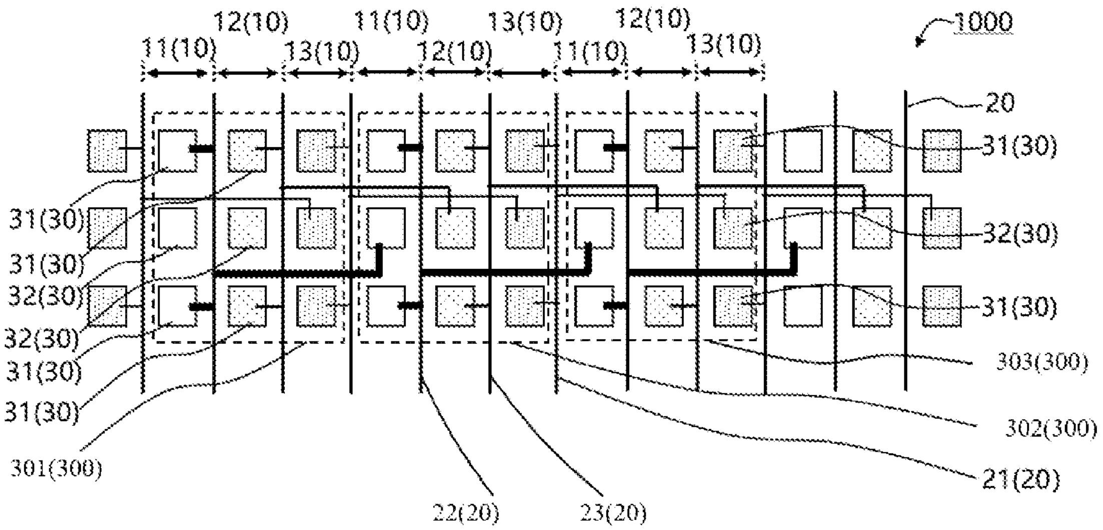
FIG. 1 is a schematic diagram of a first local top-view structure of a display panel provided by one embodiment of the present application.

The technical solutions in the embodiments of the present application are clearly and completely described in the following with reference to the accompanying drawings in the embodiments of the present application. Obviously, the described embodiments are only part of the embodiments of the present application, but are not all embodiments of the present application. All other embodiments obtained by those skilled in the art based on the embodiments of the present disclosure without creative efforts are within the scope of the present disclosure. Besides, it should be understood that the specific embodiments described herein are merely for describing and explaining the present application and are not intended to limit the present application. In the present application, unless opposite stated, the orientation words used such as "upper" and "lower" generally refer to the upper and lower directions of the device in actual using or working state, and specifically refer to the drawing directions in the drawings, and "inner" and "outer" refer to the outline of the device.

The present application provides a display panel. The display panel includes a plurality of sub-pixel columns and a plurality of data lines sequentially arranged along a first direction. Each of the sub-pixel columns includes a plurality of sub-pixels arranged along a second direction. The first direction is perpendicular to the second direction. Colors of the sub-pixels are same in one of the sub-pixel columns. The plurality of sub-pixel columns form at least two repeated pixel groups arranged along the first direction. Colors of the sub-pixels in different sub-pixel columns are different from each other in same one of the pixel groups. One of the data lines is disposed between adjacent two of the sub-pixel columns. Wherein, the sub-pixels of each of the sub-pixel columns include at least one first sub-pixel and at least one second sub-pixel, and the first sub-pixels and the second sub-pixels are arranged alternately. In the two sub-pixel columns of a same color in two adjacent pixel groups, and a first sub-pixel in one of the sub-pixel columns and a second sub-pixel in another one of the sub-pixel columns are electrically connected to one same data line.

One embodiment of the present application further provides a terminal device including the aforesaid display panel.

In the present application, by designing the same data line to connect sub-pixels of the same color, dot inversion can be realized with column inversion. As one data line is electrically connected to sub-pixels of one same color, when the display panel displays red-blue, red-green, green-blue images, there is no need to switch signals to charge sub-pixels of different colors, so that charging times of each sub-pixel is sufficient, which remedies the problem of uneven charging, and improves display quality and display performance of the display panel.

The display panel and the terminal device provided by the present application is described in detail below in combined with specific embodiments. It should be noted that a description order of the following embodiments is not intended to limit a preferred order of the embodiments.

First Embodiment

Figure 2:
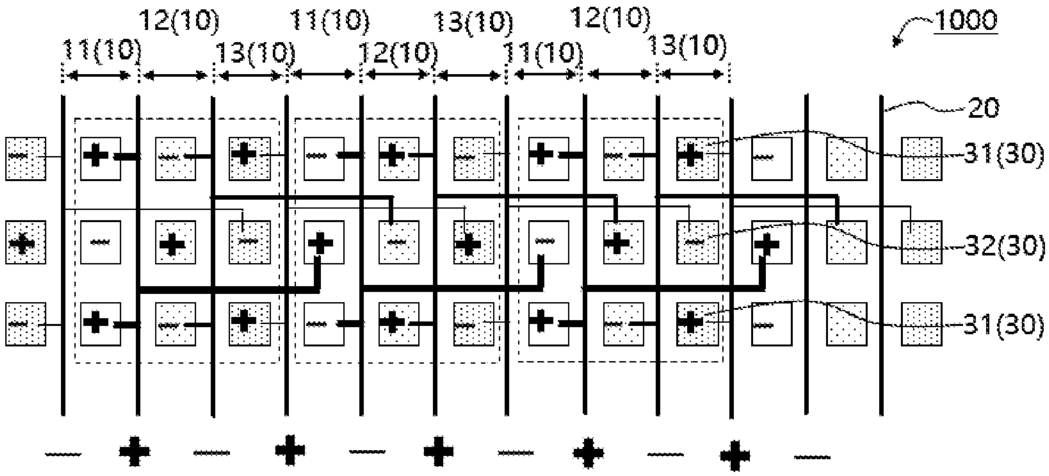
FIG. 2 is a schematic diagram of a dot inversion driving method of the display panel provided by one embodiment of the present application.

Please refer to FIG. 1 and FIG. 2. FIG. 1 is a schematic diagram of a first local top-view structure of a display panel 1000 provided by this embodiment. FIG. 2 is a schematic diagram of a dot inversion driving method of the display panel 1000 provided by this embodiment. The structure of the display panel 1000 in FIG. 2 is same as the structure of the display panel 1000 in FIG. 1. In order to make FIG. 2 be intuitive and clear, some reference numbers are omitted in FIG. 2 compared to FIG. 1. The "+" sign in FIG. 2 refers that the electrical signal is positive, and the "−" sign refers that the electrical signal is negative.

In this embodiment, the display panel 1000 includes a plurality of sub-pixel columns 10 arranged sequentially along the first direction. Each of the sub-pixel columns 10 includes a plurality of sub-pixels 30 arranged along a second direction. The first direction is perpendicular to the second direction. Specifically, the first direction is a horizontal direction illustrated in the figure, and the second direction is a vertical direction illustrated in the figure. Colors of the sub-pixels 10 are same in one of the sub-pixel columns 10. The sub-pixels 30 of each of the plurality of sub-pixel columns 10 include at least one first sub-pixel 31 and at least one second sub-pixel 32, and the first sub-pixels 31 and the second sub-pixels 32 are arranged alternately.

At least two pixel groups 300 arranged along the first direction include plurality of the sub-pixel columns 10. Each sub-pixel column 10 belongs to only one pixel group 300. Colors of the sub-pixels 30 in different sub-pixel columns 10 are different from each other in same one of the pixel groups 300. Preferably, the pixel groups 300 are repeated pixel groups. It should be noted that the "repeated pixel group" here refers to repeated arrangement of the sub-pixel columns 10 in each pixel group 300, which specifically includes number arrangement of the sub-pixel columns 10, color arrangement of the sub-pixels 30 in the sub-pixel column 10, etc.

Specifically, the pixel groups 300 at least include three sub-pixel columns 10 arranged sequentially, i.e., at least any three adjacent sub-pixel columns 10 form one pixel group 300. In this embodiment, each pixel group 300 includes three sub-pixel columns 10. It can be understood that in other embodiments, each pixel group 300 can further include four sub-pixel columns 10 (not shown in the figures), which only needs to satisfy a light-emitting design.

Specifically, as illustrated in FIG. 1, the sub-pixel columns 10 of the display panel 1000 include sub-pixel columns of three colors, e.g., red sub-pixel columns, green sub-pixel columns, and blue sub-pixel columns are included. The plurality of red sub-pixels are arranged in a column to form one red sub-pixel column, the plurality of green sub-pixels are arranged in a column to form one green sub-pixel column, and the plurality of blue sub-pixels are arranged in a column to form one blue sub-pixel column, i.e., colors of the plurality of sub-pixels located in one same sub-pixel column 10 are same. When the display panel 1000 includes the sub-pixels of three colors, any three adjacent sub-pixel columns 10 form one pixel group 300. When the display panel 1000 includes the sub-pixels of four colors, any four adjacent sub-pixel columns 10 form one pixel group 300. That is, a number of adjacent sub-pixel columns 10 included in one pixel group 300 is same as a type of the sub-pixels of different colors included in the display panel 1000.

Specifically, in this embodiment, the three sub-pixel columns 10 included in the pixel group 300 are a first color sub-pixel column 11, a second color sub-pixel column 12, and a third color sub-pixel column 13 along the first direction in sequence. The color of the plurality of sub-pixels in the first color sub-pixel column 11, the color of the plurality of sub-pixels in the second color sub-pixel column 12, and the color of the plurality of sub-pixels in the third color sub-pixel column 13 are different. For example, the plurality of sub-pixels in the first color sub-pixel column 11 are red sub-pixels, the plurality of sub-pixels in the second color sub-pixel column 12 are green sub-pixels, and the plurality of sub-pixels in the third color sub-pixel column 13 are blue sub-pixels. For example, the plurality of sub-pixels in the first color sub-pixel column 11 are green sub-pixels, the plurality of sub-pixels in the second color sub-pixel column 12 are blue sub-pixels, and the plurality of sub-pixels in the third color sub-pixel column 13 are red sub-pixels. For example, the plurality of sub-pixels in the first color sub-pixel column 11 are blue sub-pixels, the plurality of sub-pixels in the second color sub-pixel column 12 are red sub-pixels, and the plurality of sub-pixels in the third color sub-pixel column 13 are green sub-pixels. The color of the sub-pixels in the first color sub-pixel column 11, the color of the sub-pixels in the second color sub-pixel column 12, and the sub-pixels of the third color sub-pixel column 13 are not limited herein. Specifically, in this embodiment, the third color sub-pixel column 13 in the pixel group 300 and the first color sub-pixel column 11 of another pixel group 300 adjacent to the third color sub-pixel column 13 are adjacent to each other, i.e., an arrangement sequence of the sub-pixel columns of the three colors in one pixel group 300 is same as an arrangement sequence of the sub-pixel columns of the three colors in another pixel group 300. For example, they can both be a manner of the first color sub-pixel column 11, the second sub-pixel column 12, and the third sub-pixel column 13 arranged sequentially.

The display panel 1000 further includes a plurality of data lines 20. One of the data lines 20 is disposed between adjacent two of the sub-pixel columns 10. In two same sub-pixel columns 10 in two adjacent pixel groups 300, one of the first sub-pixels 31 in the sub-pixel column 10 and another one of the second sub-pixels 32 in the sub-pixel column 10 are electrically connected to same one of the data lines 20, i.e., colors of the sub-pixels 30 electrically connected to one same data line 20 are same.

Preferably, the first sub-pixel 31 of any one of the sub-pixel columns 10 is connected to one of the data lines 20 adjacent to the first sub-pixel 31, and the first sub-pixels 31 in any adjacent two of the sub-pixel columns 10 are electrically connected to different two of the data lines 20. By this configuration, the data lines 20 can be electrically connected to the corresponding first sub-pixel 31 nearby, thereby reducing complexity of wiring connection and improving a utilization rate of layout space.

Specifically, in this embodiment, for convenience of description, any three adjacent pixel groups 300 are defined as a first pixel group 301, a second pixel group 302 and a third pixel group 303 sequentially arranged along the first direction. The third color sub-pixel column 13 of the first pixel group 301 is adjacent to the first color sub-pixel column 11 of the second pixel group 302, and the third color sub-pixel column 13 of the second pixel group 302 is adjacent to the first color sub-pixel column 11 of the third pixel group 303.

Specifically, in this embodiment, three of the data lines 20 are configured in each of the pixel groups 300. For convenience of description, the three data lines 20 are defined to include a first data line 21, a second data line 22, and a third data line 23. The second data line 22 is disposed between the first color sub-pixel column 11 and the second color sub-pixel column 12. The third data line 23 is disposed between the second color sub-pixel column 12 and the third color sub-pixel column 13. The first data line 21 is disposed between the third color sub-pixel column 13 and the first color sub-pixel column 11 of another adjacent one of the pixel groups 300.

Preferably, in any one of the pixel groups 300, the first sub-pixel 31 of the first color sub-pixel column 11 is electrically connected to the corresponding second data line 22, the first sub-pixel 31 of the second color sub-pixel column 12 is electrically connected to the corresponding third data line 23, and the first sub-pixel 31 of the third color sub-pixel column 13 is electrically connected to the corresponding first data line 21.

Meanwhile, preferably, in the second pixel group 302: the second sub-pixel 32 of the first color sub-pixel column 11 is electrically connected to the second data line 22 of the first pixel group 301 or the second data line 22 of the third pixel group 303, the second sub-pixel 32 of the second color sub-pixel column 12 is electrically connected to the third data line 23 of the first pixel group 301 or the third data line 23 of the third pixel group 303, and the second sub-pixel 32 of the third color sub-pixel column 13 is electrically connected to the first data line 21 of the first pixel group 301 or the first data line 21 of the third pixel group 303.

Specifically, in this embodiment, as illustrated in FIG. 1, in the second pixel group 302, it can be that: the second sub-pixel 32 of the first color sub-pixel column 11 is electrically connected to the second data line 22 of the first pixel group 301, the second sub-pixel 32 of the second color sub-pixel column 12 is electrically connected to the third data line 23 of the first pixel group 301, and the second sub-pixel 32 of the third color sub-pixel column 13 is electrically connected to the first data line 21 of the first pixel group 301.

In this embodiment, by electrically connecting the first sub-pixels 31 in each of the pixel groups 300 to the corresponding data line 20 adjacent to the first sub-pixels 31, and by connecting the second sub-pixels in the second pixel group 302 to the data line 20 electrically connected to the first sub-pixel 31 of the corresponding color in the first pixel group 301 at the same time, one same data line 20 connected to sub-pixels with one same color is realized. Furthermore, by combining with column inversion, dot inversion can be realized. When the display panel displays solid color images of red and blue, red and green, and green and blue, as one data line 20 is electrically connected to sub-pixels 30 of one same color, there is no need to switch signals to charge sub-pixels 30 of different colors, so that charging times of each sub-pixel 30 is sufficient, which remedies the problem of uneven charging, and improves display quality and display performance of the display panel.

Preferably, polarities of electrical signals of the plurality of sub-pixels 30 electrically connected to one same data line 20 are same. In any two adjacent data lines 20, the polarity of the electrical signal of the sub-pixel 30 electrically connected to one of the data lines 20 is opposite to the polarity of the electrical signal of the sub-pixel 30 electrically connected to another data line 20, i.e., the polarities of the electrical signals of the plurality of sub-pixels 30 electrically connected to the two adjacent data lines 20 are opposite.

Specifically, as illustrated in FIG. 2, by configuring the polarities of the electrical signals of the plurality of sub-pixels 30 electrically connected to one same data line 20 to be same, the polarities of the electrical signals of the plurality of sub-pixels 30 electrically connected to the two adjacent data lines 20 are opposite. Therefore, driving display panel 1000 by the dot inversion manner can be realized, and the polarities of the electrical signals of any two adjacent sub-pixels are opposite, i.e., dot inversion can be realized by inputting electrical signals with opposite polarities to two adjacent data lines 20, which simplifies the driving manner of the display panel 1000, saves power consumption, and improves display quality and performance.

It should be noted that in the aforesaid implement situation of this embodiment, under a situation that one same data line 20 is connected to the sub-pixels 30 of the same color, the display panel 1000 can also be driven by other inversion manners other than the dot inversion driving.

In addition, it should be noted that, in this embodiment, due to the different distances, the connection manners of the first sub-pixel 31 and the second sub-pixel 32 to the corresponding data lines 20 can also be different.

Second Embodiment

The structure of this embodiment is similar to the structure of the first embodiment. The difference is that connection between the second sub-pixel 32 and the corresponding data line 20 of the display panel 1000 is further described in this embodiment.

Figure 3:
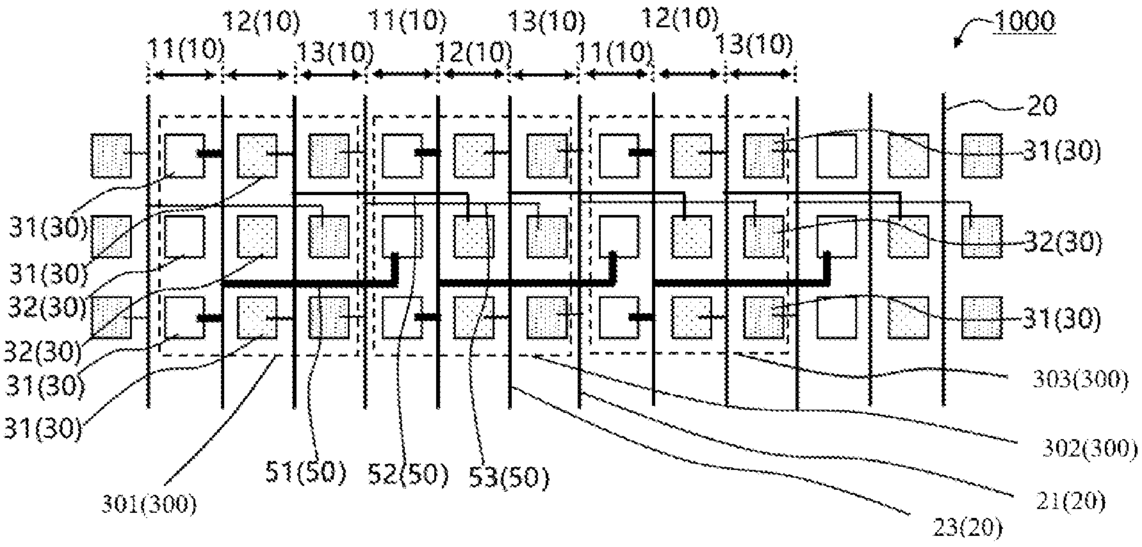
FIG. 3 is a schematic diagram of a first connection method of connection lines of the display panel provided by one embodiment of the present application.

Specifically, in this embodiment, as a certain distance is presence between the second sub-pixel 32 and the corresponding data line 20, and other data lines 20 and sub-pixels 30 are disposed between the second sub-pixel 32 and the corresponding data line 20, so the display panel 1000 can further include a plurality of connection lines 50. As illustrated in FIG. 3, the structures of the FIG. 3 and FIG. 1 are same. The difference is that the reference number of the connection line 50 is added. The second sub-pixels 32 in the sub-pixel columns 10 are connected to the corresponding data lines 20 through the connection lines 50.

Preferably, any one of the connection lines 50 is insulated from other data lines 20 except the data lines 20 connected to the one of the connection lines 50. Specifically, in this embodiment, when the connection line 50 is connected to the corresponding second sub-pixel 32 and the corresponding data line 20, as there is a certain distance between the second sub-pixel 32 and the corresponding data line 20, and other data lines 20 are disposed therebetween, so the connection line 50 can intersect or be interlaced with one or more data lines 20. At this time, the connection line 50 is preferably disposed insulated from the intersected data lines 20, so as to ensure that the electrical signals of the data lines 20 are correctly transmitted to the corresponding sub-pixels 30.

Preferably, regarding the insulation configuration of the connection line 50 and the intersected data line 20, the specific configuration can be: at least a part of the connection lines 50 is located in a different layer structure from the data lines 20 intersected with the connection lines 50. For example, the entire connection line 50 is a conductive line in a different layer from the data line 20. For example, the part of the connection line 50 is a bridge electrode at a different layer from the data line 20.

Please continue referring to FIG. 3. FIG. 3 is a schematic diagram of a first connection method of connection lines of the display panel 1000 provided by one embodiment of the present application. FIG. 3 and FIG. 1 are similar, and the difference is that the reference number of the connection line 50 is added.

Specifically, in this embodiment, as illustrated in FIG. 3, FIG. 3 is the schematic diagram of the first connection method of connection lines of the display panel 1000 provided by this embodiment. The plurality of connection lines 50 include a first connection line 51, a second connection line 52, and a third connection line 53. For ease to read, the connection lines 50 of different thicknesses in FIG. 3 respectively refers to a first connection line 51, a second connection line 52, and a third connection line 53. In the first connection line 51, the second connection line 52, and the third connection line 53; the second connection line 52 is the thickest, the third connection line 53 is second, and the first connection line 51 is the thinnest.

In this embodiment, in the second pixel group 302, the second sub-pixel 32 of the first color sub-pixel column 11 is electrically connected to the second data line 22 of the first pixel group 301 through the first connection line 51, the second sub-pixel 32 of the second color sub-pixel column 12 is electrically connected to the third data line 23 of the first pixel group 301 through the second connection line 52, and the second sub-pixel 32 of the third color sub-pixel column 13 is electrically connected to the first data line 21 of the first pixel group 301 through the third connection line 53.

Compared to the first embodiment, long-distance connection between the second sub-pixel 32 and the corresponding data line 20 is realized in this embodiment through disposing the connection lines 50.

Third Embodiment

The structure of this embodiment is similar to the structure of the second embodiment, and the difference between them is that: in the second embodiment, the second sub-pixels 32 in the second pixel group 302 are all connected to the corresponding data lines 20 in the first pixel group 301, while in this embodiment, a part of the second sub-pixels 32 in the second pixel group 302 is connected to the corresponding data lines 20 in the first pixel group 301, and a part of the second sub-pixels 32 are connected to the corresponding data lines 20 in the third pixel group 303.

Figure 4:
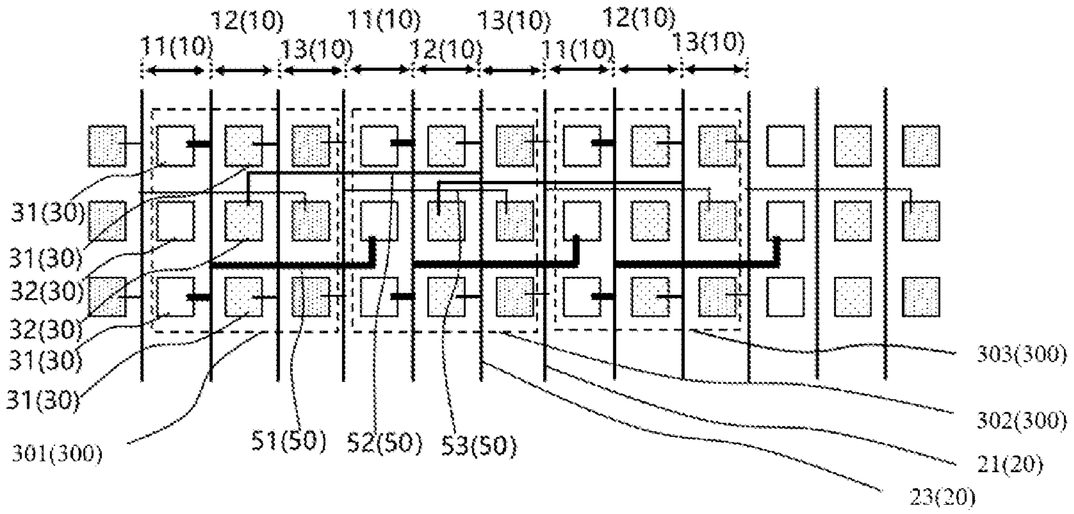
FIG. 4 is a schematic diagram of a second connection method of the connection lines of the display panel provided by one embodiment of the present application.

Specifically, please refer to FIG. 4. FIG. 4 is a schematic diagram of a second connection method of the connection lines of the display panel 1000 provided by one embodiment of the present application. In this embodiment, in the second pixel group 302, it can also be that: the second sub-pixel 32 of the first color sub-pixel column 11 is electrically connected to the second data line 22 of the first pixel group 301 through the first connection line 51, the second sub-pixel 32 of the second color sub-pixel column 12 is electrically connected to the third data line 23 of the third pixel group 303 through the second connection line 52, and the second sub-pixel 32 of the third color sub-pixel column 13 is electrically connected to the first data line 21 of the first pixel group 301 through the third connection line 53.

Compared to the second embodiment, in this embodiment, the second sub-pixels 32 in the second pixel group 302 are respectively connected to the data lines 20 nearby in the adjacent first pixel group 301 and the adjacent third pixel group 303 through the connection lines 50, which reduces the complexity of wiring connections and improves the utilization rate of the layout space.

Fourth Embodiment

Figure 5:
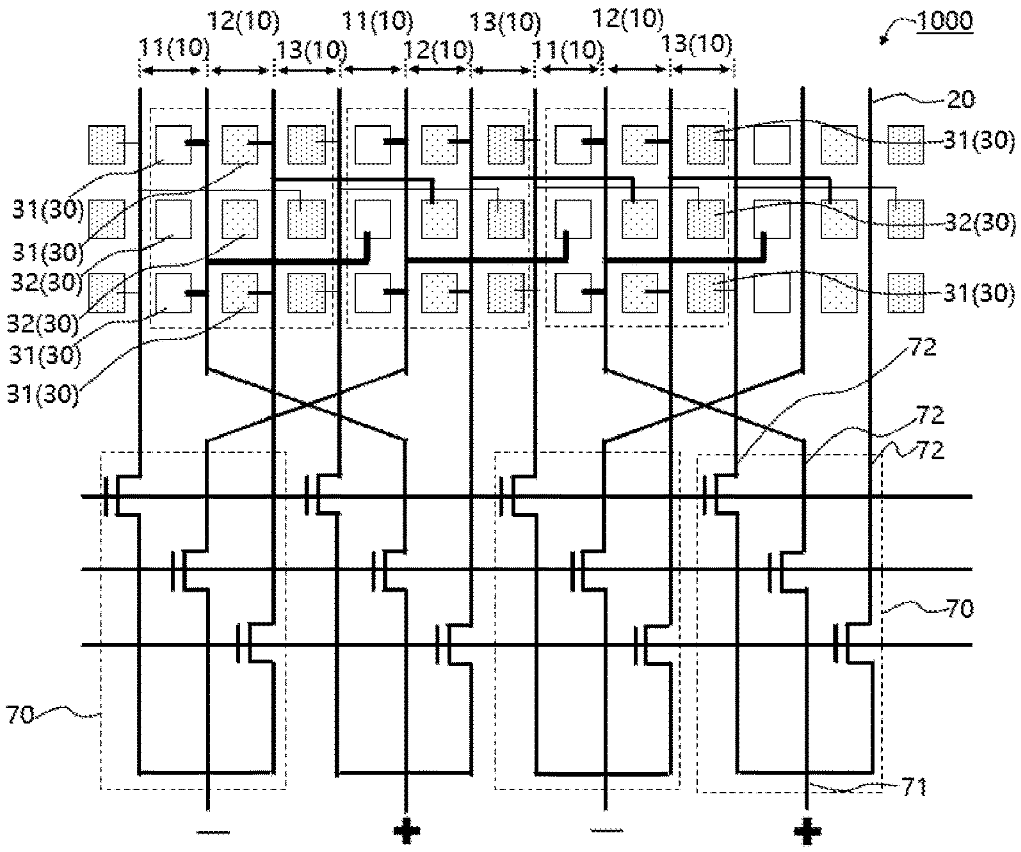
FIG. 5 is a schematic diagram of a second local top-view structure of the display panel provided by one embodiment of the present application.

The structure of the display panel 1000 of this embodiment is similar to the structure of the display panel 1000 of the aforesaid first embodiment, and the difference is that: in this embodiment, the display panel 1000 further includes demultiplexing (demux) circuits. Please refer to FIG. 5. FIG. 5 is a schematic diagram of a second local top-view structure of the display panel 1000 provided by one embodiment of the present application. The connection lines 50 of different thicknesses in FIG. 5 respectively refer to the first connection line 51, the second connection line 52, and the third connection line 53. In FIG. 5, the "+" sign refers that the electrical signal is positive, and the "−" sign refers that the electrical signal is negative.

In this embodiment, the display panel 1000 further includes a plurality of demultiplexing circuits 70. The plurality of demultiplexing circuits 70 are electrically connected to the plurality of data lines 20, and two adjacent data lines 20 are respectively electrically connected to two adjacent demultiplexing circuits 70.

Specifically, the plurality of demultiplexing circuits 70 are configured to provide the electrical signals to the data lines 20. One same demultiplexing circuit 70 provides electrical signals of one polarity in one frame of an image. The polarities of the electrical signals provided by two adjacent demultiplexing circuits 70 in one frame of an image are opposite. Two adjacent data lines 20 are respectively electrically connected to two adjacent demultiplexing circuits 70. Therefore, the polarities of the electrical signals provided by the two adjacent data lines 20 to the connected sub-pixels 30 are made to be opposite, which can realize dot inversion driving of the display panel 1000 and opposite polarities of the electrical signals of any two adjacent sub-pixels, i.e., the dot inversion can be realized by inputting electrical signals with opposite polarities to two adjacent data lines 20, which simplifies the driving manner of the display panel 1000, saves power consumption, and improves display quality and performance.

Specifically, configuration of the plurality of demultiplexing circuit 70 further reduces a bezel width of the display panel 1000, and redundant description will not be mentioned herein again.

In some embodiments, the plurality of demultiplexing circuits 70 include input terminals 71 and at least three output terminals 72. The output terminals 72 are electrically connected to the data lines, and polarities of electrical signals of the input terminals 71 of two adjacent demultiplexing circuits 70 are opposite.

Specifically, by configuring polarities of electrical signals of the input terminals 71 of two adjacent demultiplexing circuits 70 to be opposite, the dot inversion driving method of the display panel 1000 can be realized.

It should be noted that, in FIG. 2 and FIG. 5, the "+" sign refers that the electrical signal is positive, and the "−" sign refers that the electrical signal is negative, but they to not refer to that the polarities of the electrical signals do not change. The purpose of the positive polarity of the electrical signal and the negative polarity of the electrical signal is to represent that the polarities of the electrical signals are opposite. For example, in one frame of an image, one electrical signal is positive, and the other is negative; and in a next frame of the image, the one electrical signal can be negative, and the other electrical signal can be positive.

Fifth Embodiment

Figure 6:
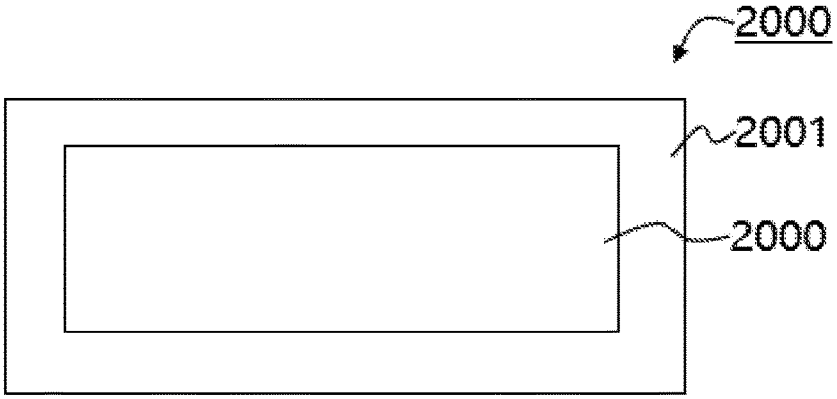
FIG. 6 is a schematic diagram of a terminal device provided by one embodiment of the present application.

Please refer to FIG. 6. FIG. 6 is a schematic diagram of a terminal device 2000 provided by one embodiment of the present application.

This embodiment provides a terminal device 2000. The terminal device 2000 includes a terminal main body 2001 and the display panel 1000 of any one of the aforesaid embodiments. The display panel 1000 is connected to the terminal main body 2001.

Specifically, the terminal device can be one of a television receiver, a mobile phone, a notebook computer, a tablet computer, an advertisement placement device, etc.

Specifically, the terminal body 2001 can include other components such as a housing, a processor, etc.

The flexible display and the terminal device provided by the embodiments of the present application are described in detail. This article uses specific cases for describing the principles and the embodiments of the present application, and the description of the embodiments mentioned above is only for helping to understand the method and the core idea of the present application. Meanwhile, for those skilled in the art, will have various changes in specific embodiments and application scopes according to the idea of the present application. In summary, the content of the specification should not be understood as limit to the present application.

What is claimed is:

1. A display panel, wherein the display panel comprises:

a plurality of sub-pixel columns arranged along a first direction, wherein each of the sub-pixel columns comprises a plurality of sub-pixels arranged along a second direction, the first direction is perpendicular to the second direction, and colors of the sub-pixels are same in same one of the sub-pixel columns; and a plurality of data lines, wherein one of the plurality of data lines is disposed between adjacent two of the sub-pixel columns;

wherein the sub-pixels of each of the plurality of sub-pixel columns comprise at least one first sub-pixel and at least one second sub-pixel, and the first sub-pixel and the second sub-pixel are arranged alternately; and wherein pixel groups arranged along the first direction comprise the sub-pixel columns; and colors of the sub-pixels in different sub-pixel columns are different from each other in one of the pixel groups, the first sub-pixel of one of two sub-pixel columns of a same color in two adjacent pixel groups and the second sub-pixel of another one of the two sub-pixel columns of the same color in the two adjacent pixel groups are connected to same one of the data lines;

wherein in one of the pixel groups, the first sub-pixel of one of the sub-pixel columns is electrically connected to one of the data lines adjacent to the sub-pixel columns, first sub-pixels in adjacent two of the sub-pixel columns are electrically connected to different two of the data lines, the second sub-pixel in one of the sub-pixel columns is electrically connected to the data line in another pixel group adjacent to the pixel group;

wherein each of the pixel groups comprises at least three adjacent sub-pixel columns arranged along the first direction, the at least three sub-pixel columns comprise a first color sub-pixel column, a second color sub-pixel column, and a third color sub-pixel column;

any adjacent three of the pixel groups arranged along the first direction comprise a first pixel group, a second pixel group, and a third pixel group;

the third color sub-pixel column of the first pixel group is adjacent to the first color sub-pixel column of the second pixel group, the third color sub-pixel column of the second pixel group is adjacent to the first color sub-pixel column of the third pixel group, three of the data lines electrically connected to one of the pixel groups comprise a first data line, a second data line, and a third data line; the second data line is disposed between the first color sub-pixel column and the second color sub-pixel column, the third data line is disposed between the second color sub-pixel column and the third color sub-pixel column, the first data line is disposed between the third color sub-pixel column and the first color sub-pixel column of another adjacent one of the pixel groups;

in any one of the pixel groups, the first sub-pixel of the first color sub-pixel column is electrically connected to the second data line that is corresponded, the first sub-pixel of the second color sub-pixel column is electrically connected to the third data line that is corresponded, and the first sub-pixel of the third color sub-pixel column is electrically connected to the first data line that is corresponded; and in the second pixel group, the second sub-pixel of the first color sub-pixel column is electrically connected to the second data line of the first pixel group or the second data line of the third pixel group, the second sub-pixel of the second color sub-pixel column is electrically connected to the third data line of the first pixel group or the third data line of the third pixel group, and the second sub-pixel of the third color sub-pixel column is electrically connected to the first data line of the first pixel group or the first data line of the third pixel group.

2. The display panel as claimed in claim 1, wherein polarities of electrical signals of the sub-pixels electrically connected to same one of the data lines are same, and a polarity of an electrical signal of the sub-pixels electrically connected to one of any two adjacent data lines is opposite to a polarity of an electrical signal of the sub-pixels electrically connected to another one of the two adjacent data lines.

3. The display panel as claimed in claim 1, wherein the display panel comprises a plurality of connection lines, second sub-pixels in the sub-pixel columns are connected to the data lines that are corresponded through the connection lines.

4. The display panel as claimed in claim 3, wherein each of the connection lines is insulated from a part of the data lines except a part of the data lines connected to the connection lines.

5. The display panel as claimed in claim 1, wherein the plurality of connection lines comprise a first connection line, a second connection line, and a third connection line;

in the second pixel group, the second sub-pixel of the first color sub-pixel column is electrically connected to the second data line of the first pixel group or the second data line of the third pixel group through the first connection line, the second sub-pixel of the second color sub-pixel column is electrically connected to the third data line of the first pixel group or the third data line of the third pixel group through the second connection line, and the second sub-pixel of the third color sub-pixel column is electrically connected to the first data line of the first pixel group or the first data line of the third pixel group through the third connection line.

6. The display panel as claimed in claim 1, wherein the display panel comprises:

a plurality of demultiplexing circuits, wherein the plurality of demultiplexing circuits are electrically connected to the plurality of data lines, and adjacent two of the plurality of data lines are respectively electrically connected to adjacent two of the plurality of demultiplexing circuits.

7. The display panel as claimed in claim 6, wherein the plurality of demultiplexing circuits comprise an input terminal and at least three output terminals, the at least three output terminals are electrically connected to the data lines, and polarities of electrical signals of the input terminals of adjacent two of the plurality of demultiplexing circuits are opposite.

8. A terminal device, wherein the terminal device comprises a display panel, and the display panel comprises:

a plurality of sub-pixel columns arranged along a first direction, wherein each of the sub-pixel columns comprises a plurality of sub-pixels arranged along a second direction, the first direction is perpendicular to the second direction, and colors of the sub-pixels are same in same one of the sub-pixel columns; and a plurality of data lines, wherein one of the plurality of data lines is disposed between adjacent two of the sub-pixel columns;

wherein the sub-pixels of each of the plurality of sub-pixel columns comprise at least one first sub-pixel and at least one second sub-pixel, and the first sub-pixel and the second sub-pixel are arranged alternately; and wherein pixel groups arranged along the first direction comprise the sub-pixel columns; and colors of the sub-pixels in different sub-pixel columns are different from each other in one of the pixel groups, the first sub-pixel of one of two sub-pixel columns of a same color in two adjacent pixel groups and the second sub-pixel of another one of the two sub-pixel columns of the same color in the two adjacent pixel groups are connected to same one of the data lines;

wherein in one of the pixel groups, the first sub-pixel of one of the sub-pixel columns is electrically connected to one of the data lines adjacent to the sub-pixel columns, first sub-pixels in adjacent two of the sub-pixel columns are electrically connected to different two of the data lines, the second sub-pixel in one of the sub-pixel columns is electrically connected to the data line in another pixel group adjacent to the pixel group;

wherein each of the pixel groups comprises at least three adjacent sub-pixel columns arranged along the first direction, the at least three sub-pixel columns comprise a first color sub-pixel column, a second color sub-pixel column, and a third color sub-pixel column;

any adjacent three of the pixel groups arranged along the first direction comprise a first pixel group, a second pixel group, and a third pixel group;

the third color sub-pixel column of the first pixel group is adjacent to the first color sub-pixel column of the second pixel group, the third color sub-pixel column of the second pixel group is adjacent to the first color sub-pixel column of the third pixel group, three of the data lines electrically connected to one of the pixel groups comprise a first data line, a second data line, and a third data line; the second data line is disposed between the first color sub-pixel column and the second color sub-pixel column, the third data line is disposed between the second color sub-pixel column and the third color sub-pixel column, the first data line is disposed between the third color sub-pixel column and the first color sub-pixel column of another adjacent one of the pixel groups;

in any one of the pixel groups, the first sub-pixel of the first color sub-pixel column is electrically connected to the second data line that is corresponded, the first sub-pixel of the second color sub-pixel column is electrically connected to the third data line that is corresponded, and the first sub-pixel of the third color sub-pixel column is electrically connected to the first data line that is corresponded; and in the second pixel group, the second sub-pixel of the first color sub-pixel column is electrically connected to the second data line of the first pixel group or the second data line of the third pixel group, the second sub-pixel of the second color sub-pixel column is electrically connected to the third data line of the first pixel group or the third data line of the third pixel group, and the second sub-pixel of the third color sub-pixel column is electrically connected to the first data line of the first pixel group or the first data line of the third pixel group.

9. The terminal device as claimed in claim 8, wherein polarities of electrical signals of the sub-pixels electrically connected to same one of the data lines are same, and a polarity of an electrical signal of the sub-pixels electrically connected to one of any two adjacent data lines is opposite to a polarity of an electrical signal of the sub-pixels electrically connected to another one of the two adjacent data lines.

10. The terminal device as claimed in claim 8, wherein the display panel comprises a plurality of connection lines, second sub-pixels in the sub-pixel columns are connected to the data lines that are corresponded through the connection lines.

11. The terminal device as claimed in claim 10, wherein each of the connection lines is insulated from a part of the data lines except a part of the data lines connected to the connection lines.

12. The terminal device as claimed in claim 8, wherein the display panel comprises a plurality of connection lines, the plurality of connection lines comprise a first connection line, a second connection line, and a third connection line;

in the second pixel group, the second sub-pixel of the first color sub-pixel column is electrically connected to the second data line of the first pixel group or the second data line of the third pixel group through the first connection line, the second sub-pixel of the second color sub-pixel column is electrically connected to the third data line of the first pixel group or the third data line of the third pixel group through the second connection line, and the second sub-pixel of the third color sub-pixel column is electrically connected to the first data line of the first pixel group or the first data line of the third pixel group through the third connection line.

13. The terminal device as claimed in claim 8, wherein the terminal device comprises:

a plurality of demultiplexing circuits, wherein the plurality of demultiplexing circuits are electrically connected to the plurality of data lines, and adjacent two of the plurality of data lines are respectively electrically connected to adjacent two of the plurality of demultiplexing circuits.

14. The terminal device as claimed in claim 13, wherein the plurality of demultiplexing circuits comprise an input terminal and at least three output terminals, the at least three output terminals are electrically connected to the data lines, and polarities of electrical signals of the input terminals of adjacent two of the plurality of demultiplexing circuits are opposite.

15. The display panel as claimed in claim 1, wherein in each of the pixel groups, colors of the plurality of sub-pixels located in one same sub-pixel column are same, and colors of the plurality of sub-pixels located in different sub-pixel columns are different.

16. The display panel as claimed in claim 4, wherein at least a part of the connection lines is located in a different layer structure from the data lines intersected with the connection lines.

17. The display panel as claimed in claim 5, wherein a cross-sectional area of the second connection line is greater than a cross-sectional area of the third connection line, and the cross-sectional area of the third connection line is greater than a cross-sectional area of the first connecting line.

18. The terminal device as claimed in claim 8, wherein in each of the pixel groups, colors of the plurality of sub-pixels located in one same sub-pixel column are same, and colors of the plurality of sub-pixels located in different sub-pixel columns are different.

19. The terminal device as claimed in claim 11, wherein at least a part of the connection lines is located in a different layer structure from the data lines intersected with the connection lines.

20. The terminal device as claimed in claim 12, wherein a cross-sectional area of the second connection line is greater than a cross-sectional area of the third connection line, and the cross-sectional area of the third connection line is greater than a cross-sectional area of the first connecting line.

* * * * *